(12) United States Patent
Kim et al.

(10) Patent No.: US 7,670,772 B2
(45) Date of Patent: Mar. 2, 2010

(54) MICROFLUIDIC CHIP FOR MULTIPLE BIOASSAY AND METHOD OF MANUFACTURING THE SAME

(75) Inventors: Joon-ho Kim, Seongnam-si (KR); Jun-hong Min, Yongin-si (KR); Kyung-hwan Park, Gwangju-si (KR); Soo-suk Lee, Suwon-si (KR); Hyun-gyu Park, Daejeon-si (KR)

(73) Assignee: Samsung Electronics Co., Ltd. (KR)

( * ) Notice: Subject to any disclaimer, the term of this patent is extended or adjusted under 35 U.S.C. 154(b) by 738 days.

(21) Appl. No.: 11/335,939

(22) Filed: Jan. 20, 2006

(65) Prior Publication Data

US 2006/0188906 A1      Aug. 24, 2006

(30) Foreign Application Priority Data

Jan. 20, 2005    (KR) ...................... 10-2005-0005533

(51) Int. Cl.
 *C12Q 1/68*    (2006.01)
 *C12M 1/00*    (2006.01)

(52) U.S. Cl. ........................ 435/6; 435/283.1

(58) Field of Classification Search ........................ None
See application file for complete search history.

(56) References Cited

U.S. PATENT DOCUMENTS

| | | | |
|---|---|---|---|
| 6,326,058 B1 | 12/2001 | Biebuyck et al. | 427/261 |
| 6,406,845 B1 * | 6/2002 | Walt et al. | 435/6 |
| 6,632,655 B1 | 10/2003 | Mehta et al. | 435/288.5 |
| 6,709,559 B2 | 3/2004 | Sundberg et al. | 204/604 |
| 7,104,517 B1 * | 9/2006 | Derand et al. | 251/11 |
| 2001/0006780 A1 * | 7/2001 | Boldt et al. | 435/6 |
| 2003/0008308 A1 * | 1/2003 | Enzelberger et al. | 435/6 |

OTHER PUBLICATIONS

Office Action Issued by the Korean Patent Office on Jun. 27, 2006 w/English Translation regarding corresponding patent application No. 10-2005-0005533.
"A Disposable Passive Microfluidic System Integrated With Micromixer and DNA Purification Chip for DNA Sample Preparation"; Authors: Joon-Ho Kim, et al.; Micro Total Analysis Systems, vol. 1, pp. 224-226 (2002).

* cited by examiner

*Primary Examiner*—Christopher M. Babic
(74) *Attorney, Agent, or Firm*—Cantor Colburn LLP (57) ABSTRACT

Provided are a microfluidic chip for multiple bioassay and a method of manufacturing the same. The method includes: forming microfluidic channels by coupling a channel structure having grooves for sample channels and probe channels in a bottom surface and a substrate; forming probe immobilization regions at intersections between the probe channels and the sample channels; and forming blocking walls in the probe channels before and after each of the probe immobilization regions to prevent mixing of target sample. Since the probes are immobilized in the microfluidic channels after the formation of the microfluidic channels, difficulty in connecting fluidic channels after the immobilization of probes on a substrate can be removed. In addition, a microfluidic platform for a multiple bioassay into which a plurality of samples can be simultaneously loaded can be formed.

9 Claims, 13 Drawing Sheets

A Immobilization

B Blocking

C Recognition

D Reading Mosaic

FIG. 17 uTAS 2002 JHKim

MICROFLUIDIC CHIP FOR MULTIPLE BIOASSAY AND METHOD OF MANUFACTURING THE SAME

CROSS-REFERENCE TO RELATED PATENT APPLICATIONS

This application claims the benefit of Korean Patent Application No. 10-2005-0005533, filed on Jan. 20, 2005, in the Korean Intellectual Property Office, the disclosure of which is incorporated herein in its entirety by reference.

BACKGROUND OF THE INVENTION

1. Field of the Invention

The present invention relates to a microfluidic chip, and more particularly, to a microfluidic chip for a multiple bioassay that includes microfluidic channels and a method of manufacturing the microfluidic chip.

2. Description of the Related Art

A biochip which is formed by immobilizing biomolecule probes to be analyzed, such as DNA, protein or the like, on a support with high density can be used to analyze gene expression characteristics, gene defects, protein distribution, reaction pattern, or the like by detecting whether hybridization between a target material contained in a sample and the probes occurs. Biochips can be categorized into DNA chips, protein chips, and the like according to the kind of the probes. Biochips also can be categorized into microarray chips in which probes are immobilized on a solid support and microfluidic chips in which probes are immobilized on a microfluidic channel according to the probe immobilization location.

The microfluidic chip is also referred to as a lab-on-a-chip, which is a small chip by which all of assay processes, including sample injection, hybridization, and detection, can be automatically performed, and an outstanding high-end product that will replace flasks and experimental tubes in laboratories in the future. The microfluidic chip is composed of various materials, glass, quartz, plastic, silicon, or the like, and includes a plurality of intersecting microchannels which are as fine as hairs. Various complicate experiments can be simultaneously performed by flowing a fluid through the microchannels.

Figure 1:
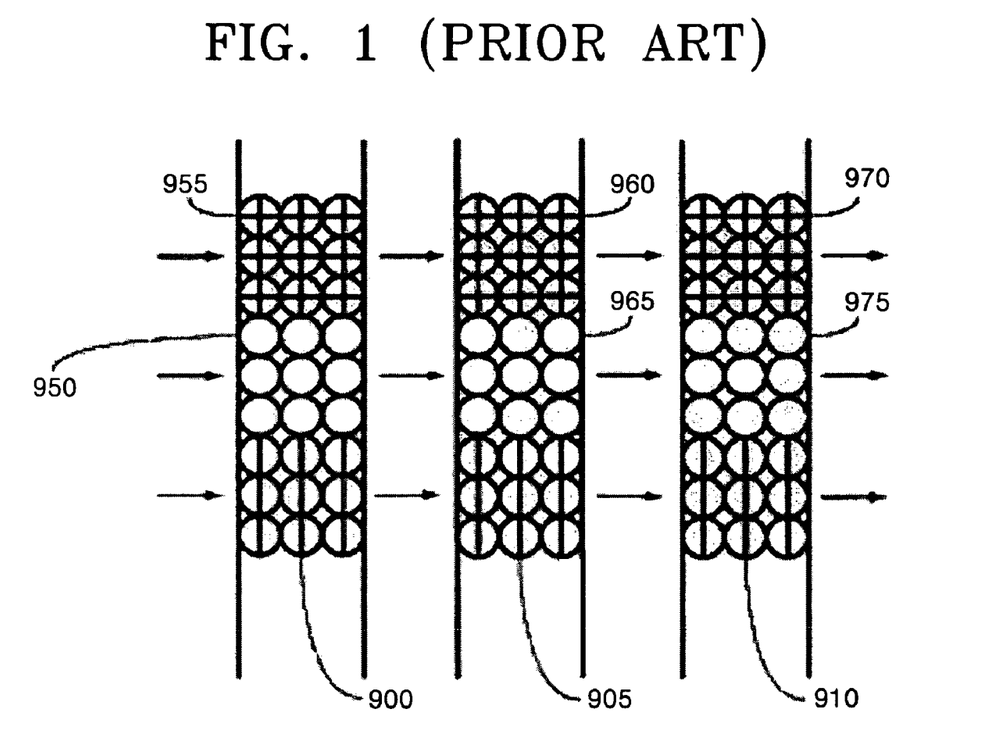
FIG. 1 illustrates a conventional bead based microfluidic chip developed by Caliper Technology Corp. (U.S. Pat. No. 6,632,655)

A bioassay platform using microfluidic channels can perform multiple tests at high speed and low costs. However, the bioassay platform raises concern about cross-contamination and problems in fluidic channel fabrication and probe immobilization processes. In order to solve problems arising during such processes, conventionally, a method of connecting channels after the immobilization of probes on a substrate (array-based microfluidic chip) has been used. However, there still are problems in the alignment of channels and immobilized probes, probability of probe damage by heat applied to connect the channels, and problems in the process of connecting the substrate with immobilized probes and channels. In addition, as illustrated in FIG. 1, a method of packing probe-immobilized beads after the fabrication of channels (bead-based microfluidic chip, U.S. Pat. No. 6,632,655) is also in use. However, this method also raises problems, such as a pressure drop, signal loss, sample loss, etc.

Figure 2:
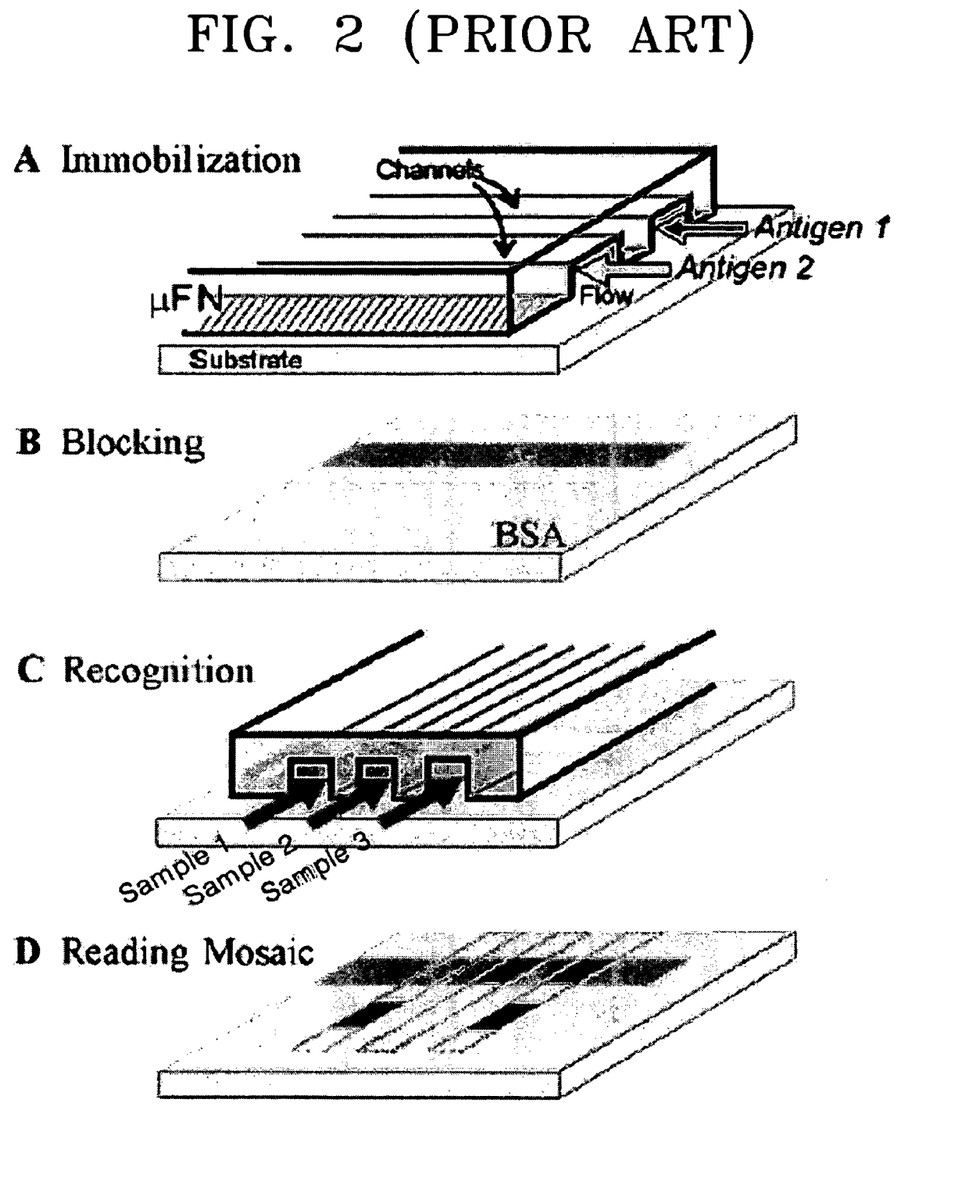
FIG. 2 illustrates a conventional micromosaic immunoassay developed by IBM (U.S. Pat. No. 6,326,058)

In addition, a micromosaic immunoassay device fabricated by patterning a substrate into a polydimethylsiloxane (PDMS) channel structure having a plurality of patterned cavities, as illustrated in FIG. 2, was developed. However, since an immunoassay is implemented through probe immobilization and sample injection while the PDMS channel structure is rotated by 90 degrees, the binding between the PDMS channel structure and glass slides is reversible, and a mold needs to be replaced. Furthermore, it is impossible to perfectly bind the PDMS channel structure and a glass slide after the surface treatment of the glass slide, a solution may leak.

Accordingly, the inventors of the present invention have made efforts to overcome such problems arising with the conventional techniques, confirmed that using a single-layered channel structure formed by immobilizing probes in a microfluidic channel using a polymer and having a blocking wall for preventing mixing of samples, a multi-bioassay can be performed using a plurality of samples, and completed the present invention.

SUMMARY OF THE INVENTION

The present invention provides a method of manufacturing a microfluidic chip for an effective multiple bioassay.

The present invention also provides a microfluidic chip for multiple bioassays manufactured using the method.

According to an aspect of the present invention, there is provided a method of forming a microfluidic chip for a multiple bioassay, the method comprising: forming microfluidic channels by coupling a channel structure having grooves for sample channels and probe channels in a bottom surface and a substrate; forming probe immobilization regions at intersections between the probe channels and the sample channels; and forming blocking walls in the probe channels before and after each of the probe immobilization regions to prevent mixing of target samples.

Any bio material that is required to be hybridized with a target sample can be used as the probes. The probes may be biomolecules selected from DNA, RNA, peptide nucleic acid (PNA), locked nucleic acid (LNA), peptide, protein, antibody and antigen. The biomolecules are immobilized in the probe immobilization regions.

The probe immobilization regions may be formed after the formation of the microfluidic channels. The probe immobilization regions may be formed using any materials having probe biomolecule binding group. The probe immobilization regions may be formed by photopolymerizing a polymer having biomolecule binding groups. The photopolymerizable polymer is selectively photopolymerized only in a portion thereof exposed through a photo-mask by UV with the aid of a photoinitiator.

In the method according to the present invention, the polymer having biomolecule binding groups can be any polymer that can be photopolymerized by UV irradiation, has biomolecule binding groups, for example, epoxy groups, amine groups, etc., and are composed of monomers, such as acrylamid, methacrylamid, acylic acid, methacrylic acid, or amides or esters which are structurally associated with these monomers. The polymer having biomolecule binding groups may be a methacrylate (GMA) polymer. GMA forms an epoxide-activated gel pad through photopolymerization.

In the method according to the present invention, the blocking walls can be formed after the formation of the microfluidic channels and can be any blocking wall without biomolecule binding groups, i.e., probes. The blocking walls may be formed by photopolymerizing a polymer that does not have biomolecule binding groups. Such a photopolymerizable polymer is polymerized by UV irradiation through a photo-mask with the aid of a photoinitiator.

In the method according to the present invention, the polymer without biomolecule binding groups can any polymer that can be photopolymerized by UV irradiation, for example, a polymer composed of monomers, such as acrylamid, methacrylamid, acylic acid, methacrylic acid, or amides or esters which are structurally associated with these monomers. The polymer without biomolecule binding groups may be a polyethyleneglycol diacrylate (PEG-DA) polymer. PEG-DA does not have biomolecule binding groups, such as epoxide, on its surface and can prevent contamination of a non-probe immobilization region by probes.

In the method according to the present invention, the channel structure serves as an upper plate covering the substrate and forms the microfluidic channels by coupling to the substrate. The channel structure may be formed of glass, PDMS, or a polymer. The channel structure may be a single layer having a plurality of sample channels and probe channels, which has no need to be replaced by a new probe channel and sample channel structure unlike in the prior art.

In the method according to the present invention, the substrate serves as a lower plate in which the probe immobilization regions are located and form the microfluidic channels by coupling to the channel structure. The substrate may be formed of glass, quartz, plastic, or silicon. The surface of the substrate may be modified to be able to smoothly couple to the probe immobilization regions or the blocking walls after the formation of the microfluidic channels.

In the method according to the present invention, the height of the probe immobilization regions may do not reach the ceiling of the microfluidic channels. When the probe immobilization regions are separated from the ceiling of the microfluidic channels, the surface area of the probe immobilization regions in which the probes bind increases, so that a target sample-probe binding signal with a large amplitude is obtained.

In the method according to the present invention, a photopolymerization of the polymer in the probe immobilization regions in the channel structure is performed under pressure, and the pressure is removed after the completion of the photopolymerization such that the height of the probe immobilization regions does not reach the ceiling of the microfluidic channels. Although the photopolymerization is performed under pressure, the probe immobilization regions may rise when the pressure is removed. However, the probe immobilization regions can be further spaced from the ceiling of the microfluidic channels by photopolymerizing the blocking walls.

In the method according to the present invention, the polymer in the probe immobilization regions is partially polymerization through UV dose control during the photopolymerization such that the height of the probe immobilization regions does not reach the ceiling of the microfluidic channels. After a UV dose required to photopolymerize the polymer such that the height of the probe immobilization regions reaches the ceiling of the microfluidic channels is measured, the partial polymerization is performed at a UV dose that is smaller than the measured UV dose.

In another aspect of the present invention, there is provided a micofluidic chip for a multiple bioassay, the microfluidic chip comprising: a substrate; a singe-layered channel structure coupled to the substrate; a plurality of sample channels and a plurality of probe channels formed in the channel structure; probe immobilization regions formed at intersections between the sample channel and the probe channels; and blocking walls formed in the probe channels before and after each of the probe immobilization regions to prevent mixing of target samples.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail.

Figure 3A:
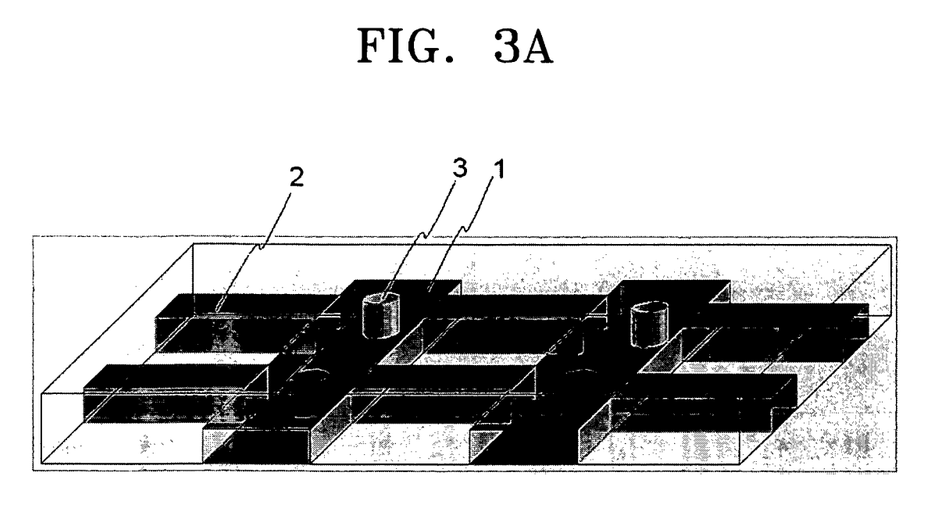
FIGS. 3A and 3B are perspective views of a microfluidic chip according to an embodiment of the present invention, respectively, before and after blocking walls are formed.

FIG. 3A is a perspective view of a microfluidic chip according to an embodiment of the present invention before blocking walls are formed. In a single-layered channel structure coupled to a substrate, two sample channels 1 and two probe channels 2 cross, and probe immobilization regions 3 are formed at intersections between the sample channels 1 and the probe channels 2.

Figure 3B:
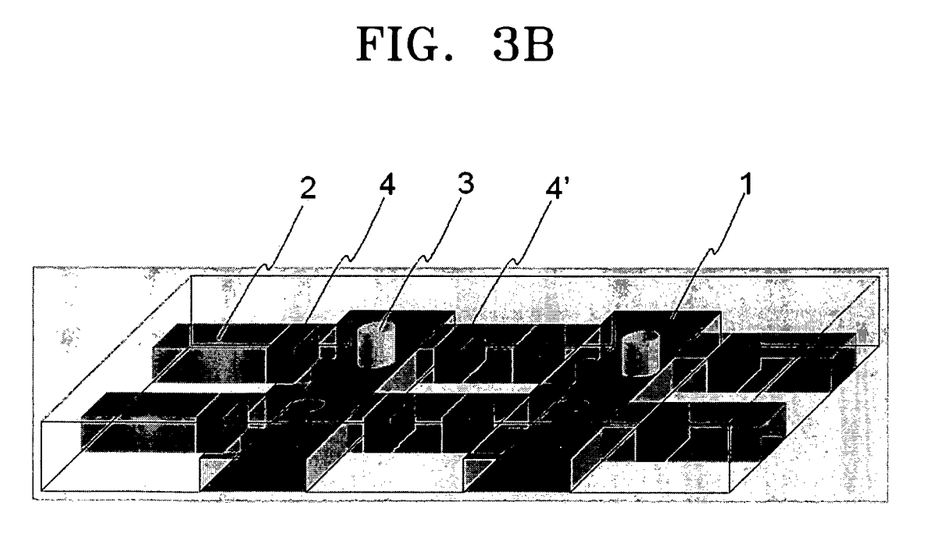

FIG. 3B is a perspective view of the microfluidic chip of FIG. 3A after blocking walls 4 and 4' are formed. In the single-layered channel structure coupled to the substrate, the two sample channels 1 and the two probe channels 2 cross, the probe immobilization regions 3 are formed at the intersections between the sample channels 1 and the probe channels 2, and a pair of blocking walls 4 and 4' are formed on two opposite sides of each of the probe immobilization regions 3.

Figure 4:
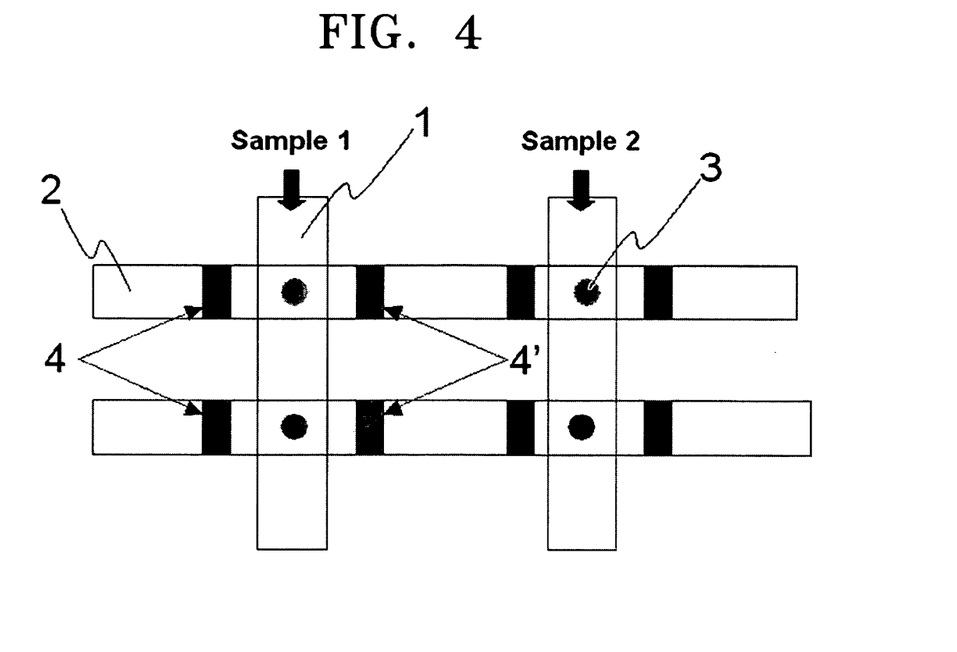
FIG. 4 is a plan view of the microfluidic chip of FIG. 3B.

FIG. 4 is a plan view of the microfluidic chip of FIG. 3B. The two sample channels 1 and the two probe channels 2 cross, the probe immobilization regions 3 are formed at the intersections between the sample channels 1 and the probe channels 2, and a pair of blocking walls 4 and 4' are formed at two opposite sides of each of the probe immobilization regions 3. A sample 1 and a sample 2 are respectively injected into the two sample channels 1. The blocking walls 4 and 4' prevent mixing of the sample 1 and the sample 2.

Figure 5:
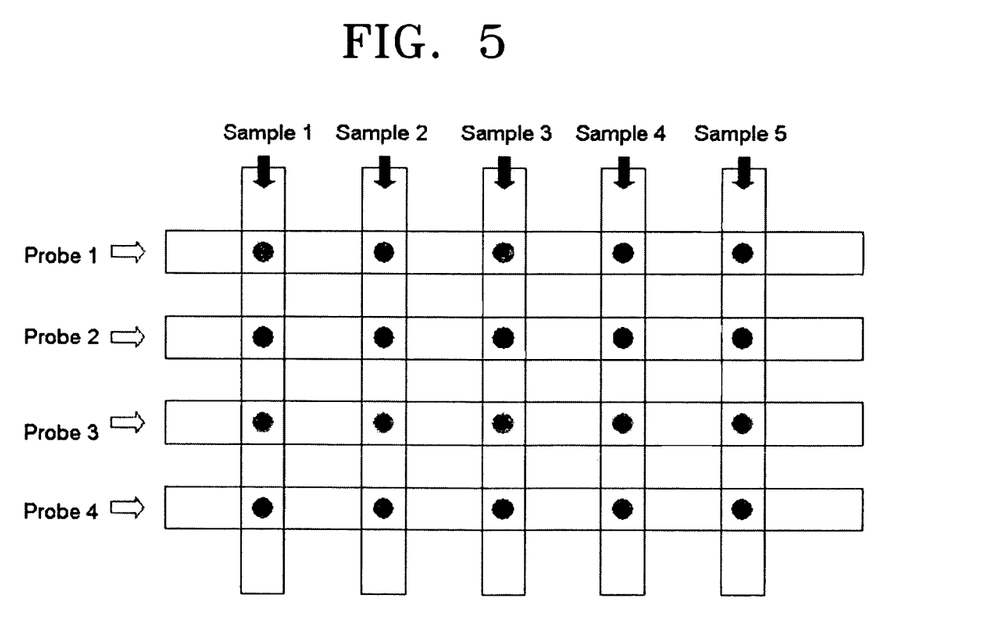
FIG. 5 is a plan view of a microfluidic chip according to another embodiment of the present invention.

FIG. 5 is a plan view of a microfluidic chip according to an embodiment of the present invention. Five sample channels and four probe channels cross, and probe immobilization regions are formed at intersections between the sample channels and the probe channels. Different probes 1 through 4 are respectively injected into the four probe channels, and different samples 1 through 5 are respectively injected into the five sample channels. The number of probe channels and sample channels can be varied according to the need, thereby enabling multiple bioassays using a plurality of samples.

Figure 6:
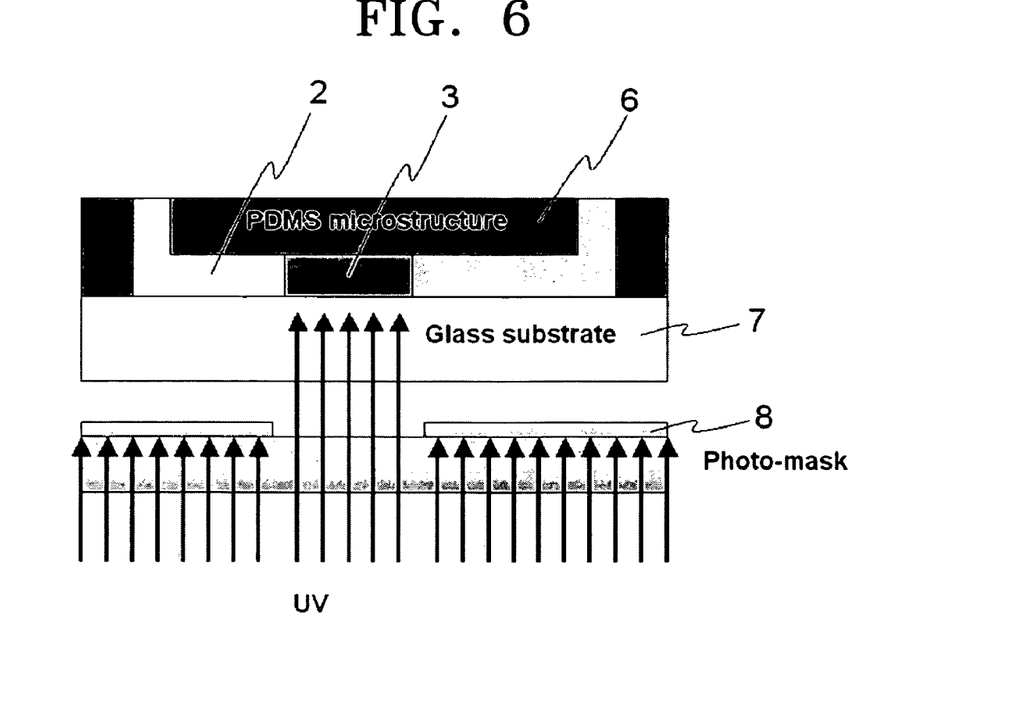
FIG. 6 is a schematic view illustrating photopolymerization in a microfluidic chip according to an embodiment of the present invention.

FIG. 6 is a schematic view illustrating photopolymerization in a microfluidic chip according to an embodiment of the present invention. FIG. 6 is a cross-sectional view of a channel structure 6 coupled to a surface of a substrate 7 taken along a probe channel 2. First, a polymer having biomolecule binding groups is disposed between the substrate 7 and the channel structure 6, and a photo-mask 8 having a pattern is placed on the substrate 7. Then, UV is radiated through the photo-mask 8 to cause photopolymerization of the monomer having biomolecule binding groups with the aid of a photoinitiator. The photopolymerization occurs according to the pattern of the photo-mask 8, thus forming probe immobilization regions 3 in a predetermined pattern. Such photopolymerization can also be used to form blocking walls (not shown). To form blocking layers, a polymer without biomolecule binding groups is photopolymerized by UV irradiation through the photo-mask 8 with the aid of a photoinitator. For example, as a probe immobilization region, an epoxide-activated gel pad can be formed using glycidyl methacrylate (GMA) and photoinitiator (HOMPP: 2-Hydroxy-2-methylpropiophenone) (refer to Hermanson G T 1996 Bioconjugate Techniques). Blocking walls can be formed using poly(ethyleneglycol) diacrylate (PEG-DA) as a polymer without biomolecule binding groups and a photoinitiator (HOMPP) can be used.

Hereinafter, the present invention will be described in detail with reference to the following examples. The following examples are only to illustrative purposes and are not intended to limit the scope of the present invention.

EXAMPLE 1

Manufacture of Microfluidic Chip

SU-8 (available from Microchem Inc.) was spin-coated on a silicon substrate, and a pattern was formed therein using photolithography, which was used as a mold for a microfluidic structure. Then, a PDMS prepolymer mixture (Sigard 184, obtained from Dowcorning Inc.) was poured added into the mold, hardened at 80° C., and separated from the substrate, thereby resulting in a PDMS structure. The PDMS structure was treated with $O_2$ plasma and coupled to a glass substrate used as a lower plate (heat treatment at a temperature of 50-80° C.). In order to facilitate covalent bonding between the polymer and the substrate in the microchannel structure, the probe channels were surface-modified with 3-(trichlorosilyl) propyl methacrylate (TPM) to activate the unmodified glass surface in acrylate form and increase the binding force between the glass substrate and GMA gel pads. Probe immobilization regions were defined using GMA photopolymerization. In detail, the microchannel structure was filled with a mixture of GMA gel pad monomers and photoinitiator (HOMPP) in a volume ratio of 99:1, exposed to UV rays through a photo-mask, and washed with pH 9.5 carbonate for several minutes to remove unphotopolymerized monomers. The resulting microchannel structure was filled with 100 µg/L of FITC-labeled anti-human IgG as a probe protein, reacted at room temperature for 20 minutes, and washed by flowing a PBS solution at a flow rate of 0.2 mL/min. Blocking walls were defined using PEG-DA photopolymerization. The blocking walls were defined in the same manner as for the GMA pads, except that PEG-DA was used as monomers.

Figure 7:
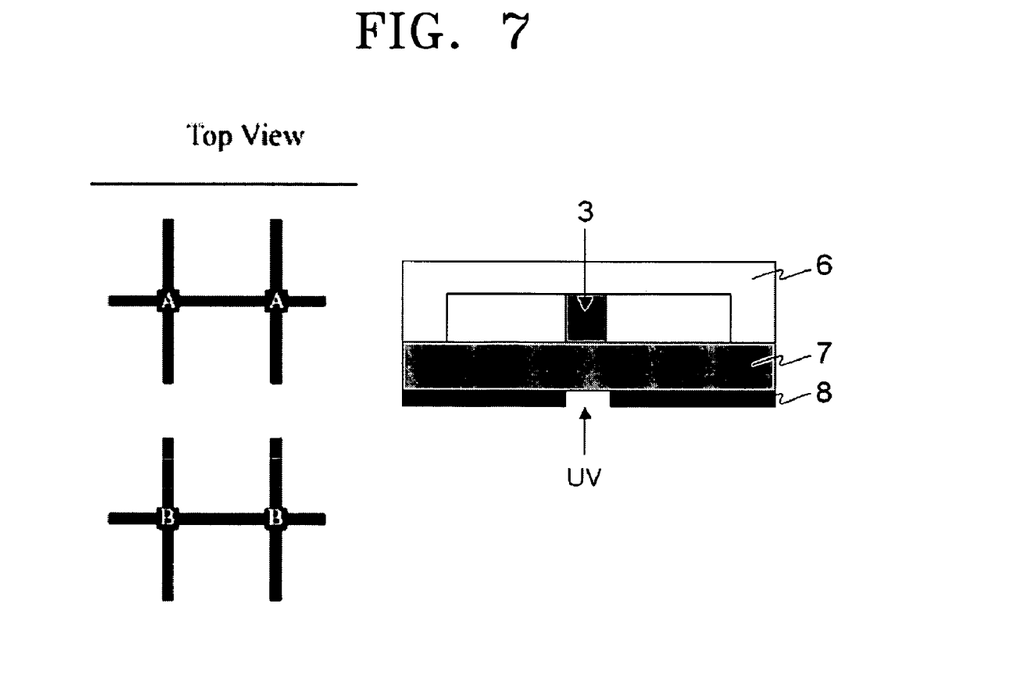
FIG. 7 is a schematic view illustrating photopolymerization in a probe immobilization region of a microfluidic chip according to Example 1.
Figure 8:
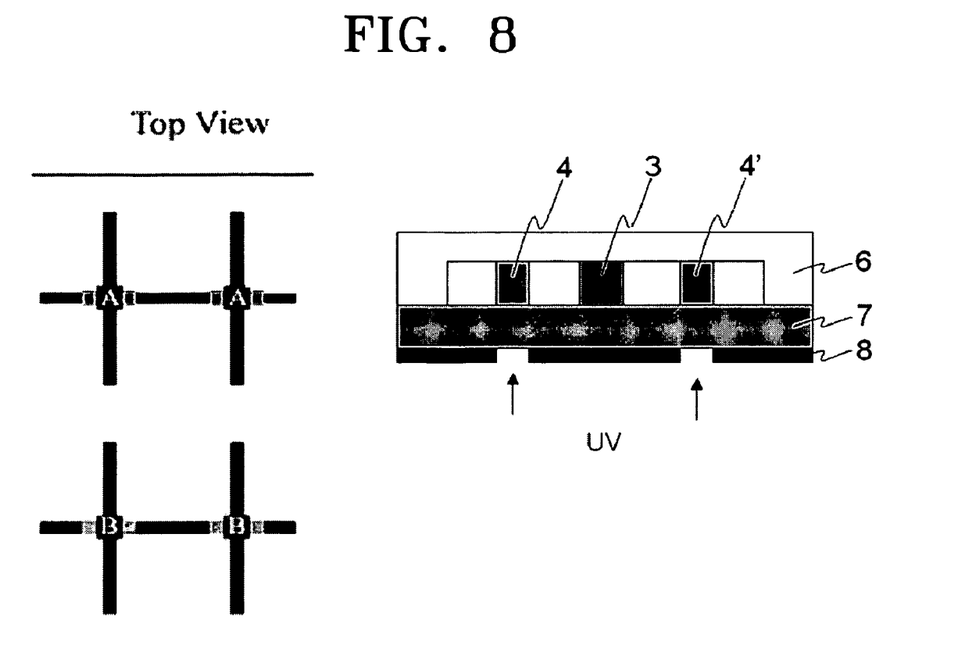
FIG. 8 is a schematic view illustrating photopolymerization of a blocking wall in the microfluidic chip according to Example 1.
Figure 9:
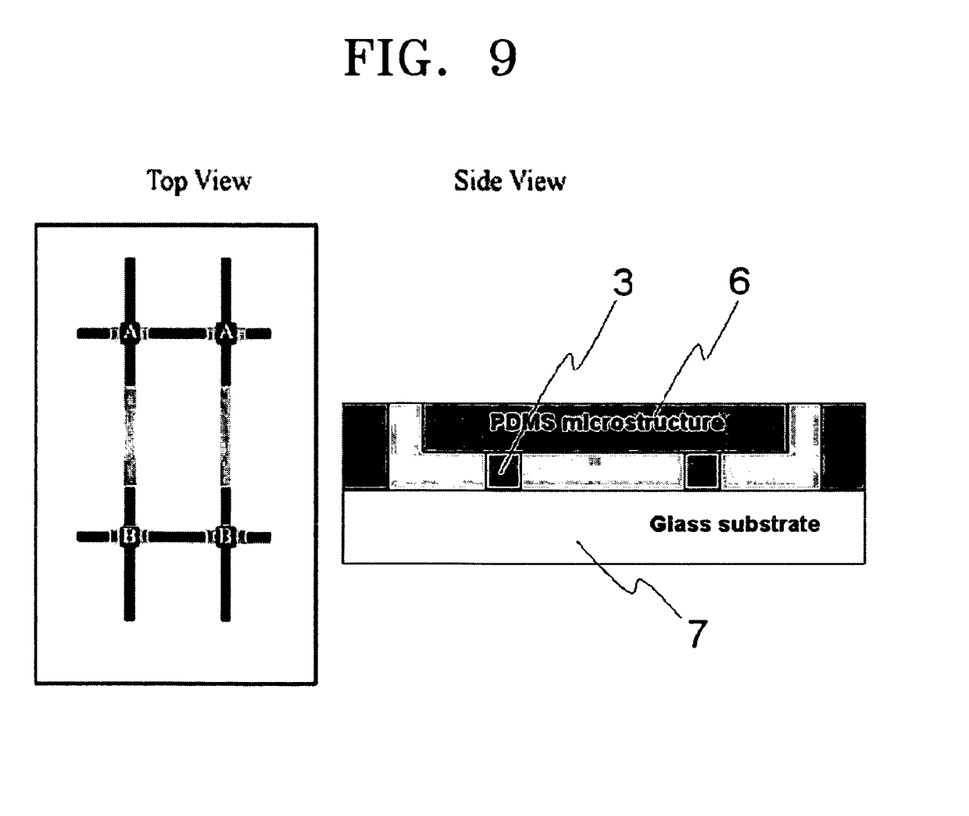
FIG. 9 is a plan view and side view of the microfluidic chip according to Example 1.
Figure 10:
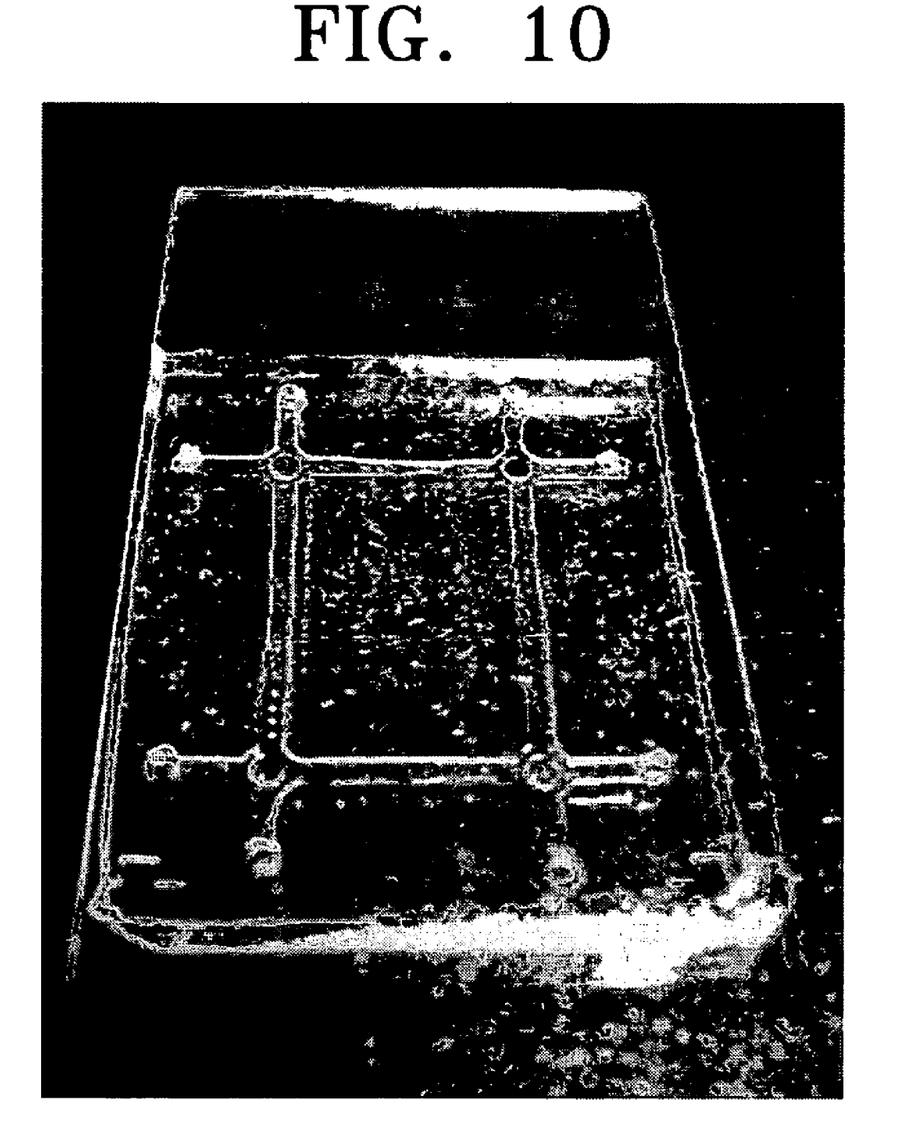
FIG. 10 is a photograph of the microfluidic chip according to Example 1.
Figure 11A:
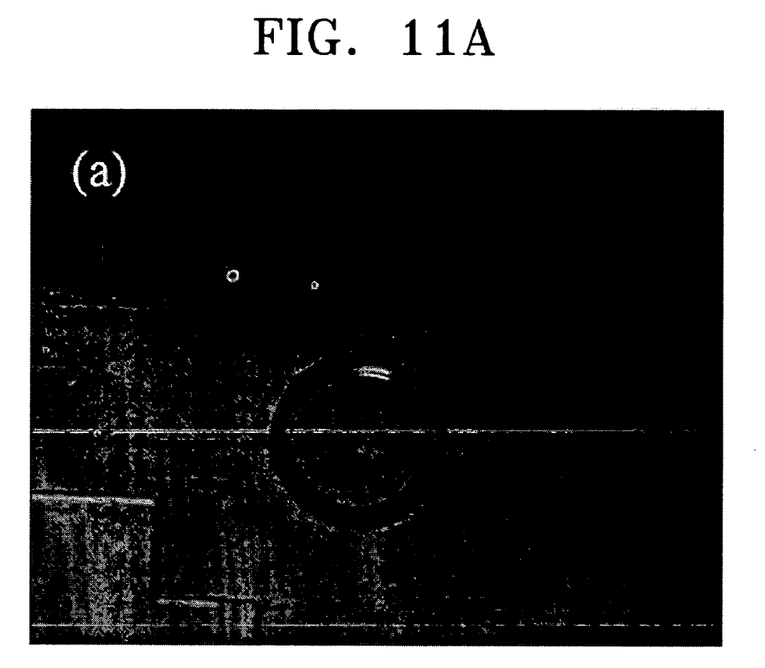
FIGS. 11A and 11B are respectively optical and fluorescent microscopic photographs of a GMA gel pad which is a probe immobilization region.
Figure 11B:
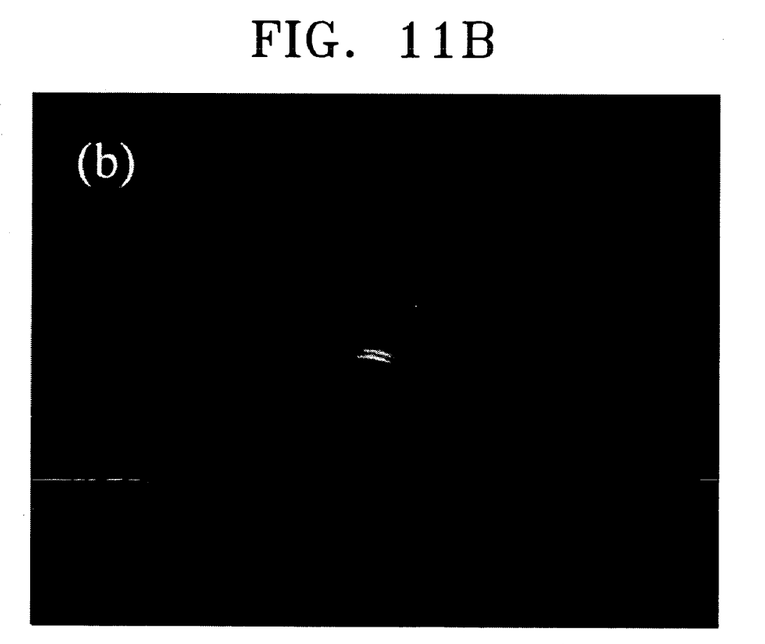

FIG. 7 is a schematic view illustrating photopolymerization for forming the probe immobilization regions in the microfluidic chip of Example 1. GMA was photopolymerized by UV irradiation through the photo-mask 8 to define the probe immobilization region 3. FIG. 8 is a schematic view illustrating photopolymerzation for forming the blocking walls in the microfluidic chip of Example 1. PEG-DA was photopolymerized by UV irradiation through the photo-mask 8 to form the blocking walls 4 and 4'. FIG. 9 is a top view and a side view of the microfluidic chip of Example 1. The top view shows two sample channels and two probe channels which cross each other, and the side view shows a section taken along a probe channel in which one probe immobilization regions 3 is formed at each of the intersections between the samples channels and the probe channels. FIG. 10 is a photograph of the microfluidic channel according to Example 1. FIGS. 11A and 11B are respectively optical and fluorescent microscopic photographs of a GMA gel pad serving as a probe immobilization region. The fluorescent image of anti-human IgG labeled with FITC and immobilized on the GMA structure was obtained using a CCD camera with a FITC filter. The diameter of the GMA gel pad was about 1000 µm.

EXAMPLE 2

Immunoassay

Specific immunoreactions were induced on GMA gel pads in the microfluidic chip according to Example 1. After the GMA gel pads according to Example 1 were formed, 0.1 g/L of human IgG and 0.1 g/L of mouse IgG were alternatively injected into the probe channels as probe proteins and immobilized in the same manner as in Example 1. After blocking walls were formed in the same manner, 100 µg/L of anti-human IgG and 100 µg/L of anti-mouse IgG labeled with FITC were respectively injected into the sample channels perpendicular to the probe channels, immunoreacted with the probe proteins at room temperature for 20 minutes, and washed in the same manner as in Example 1.

Figure 12:
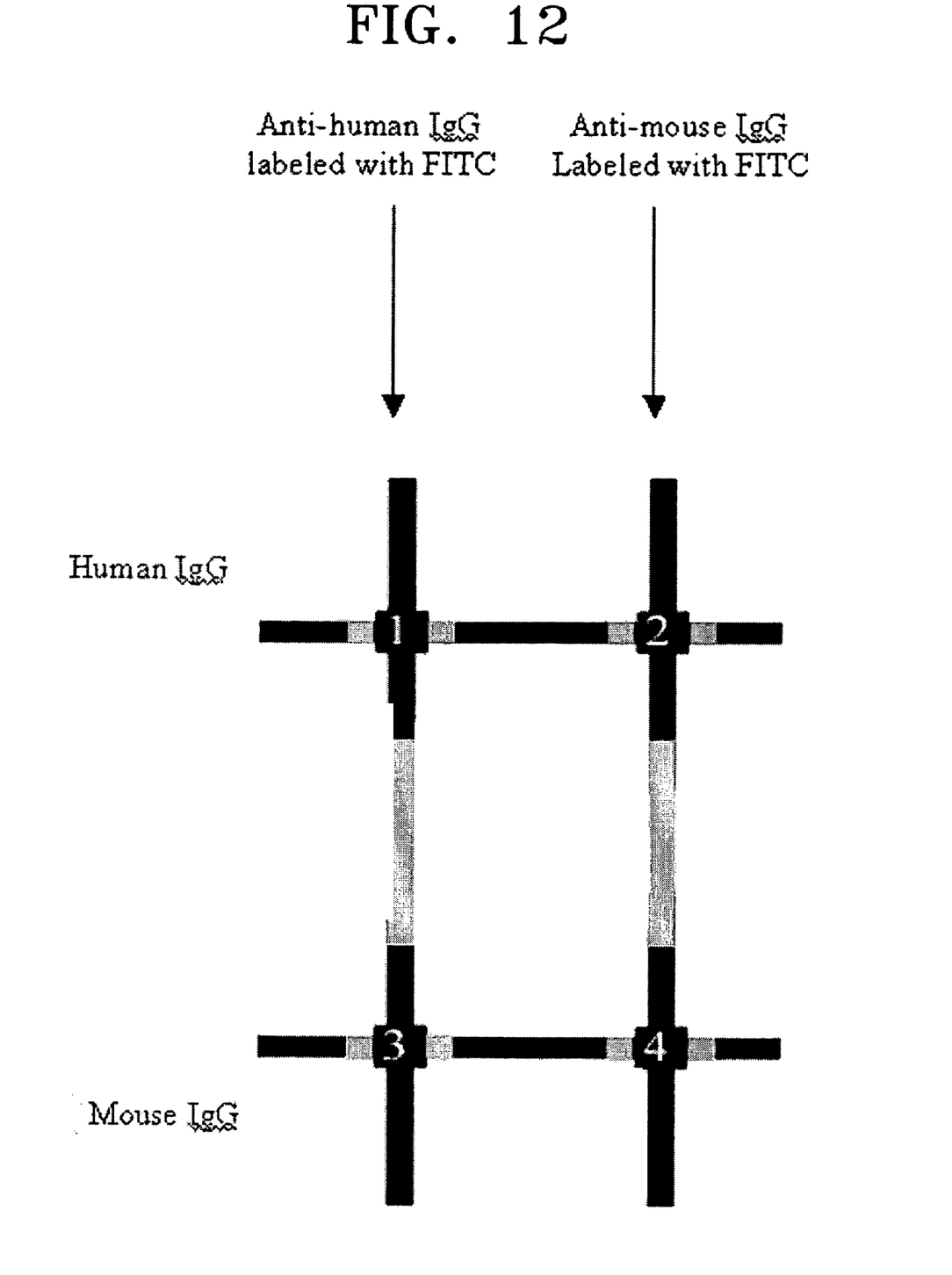
FIG. 12 is a schematic view illustrating an immunoassay according to Example 2.

FIG. 12 is a schematic view illustrating an immunoassay according to Example 2. Reference numerals 1, 2, 3, and 4 denote probe immobilization regions formed at the intersections between the sample channels and the probe channels. The types of probes (capture proteins) and target samples (target proteins) which react with the probes are shown in Table 1.

TABLE 1

| | Capture protein Solution concen. - 100 µg/L | Target protein Solution concen. - 100 µg/L |
|---|---|---|
| 1 | Antigen human IgG | Antibody human IgG |
| 2 | Antigen human IgG | Antibody mouse IgG |
| 3 | Antigen mouse IgG | Antibody human IgG |
| 4 | Antigen mouse IgG | Antibody mouse IgG |

Figure 13:
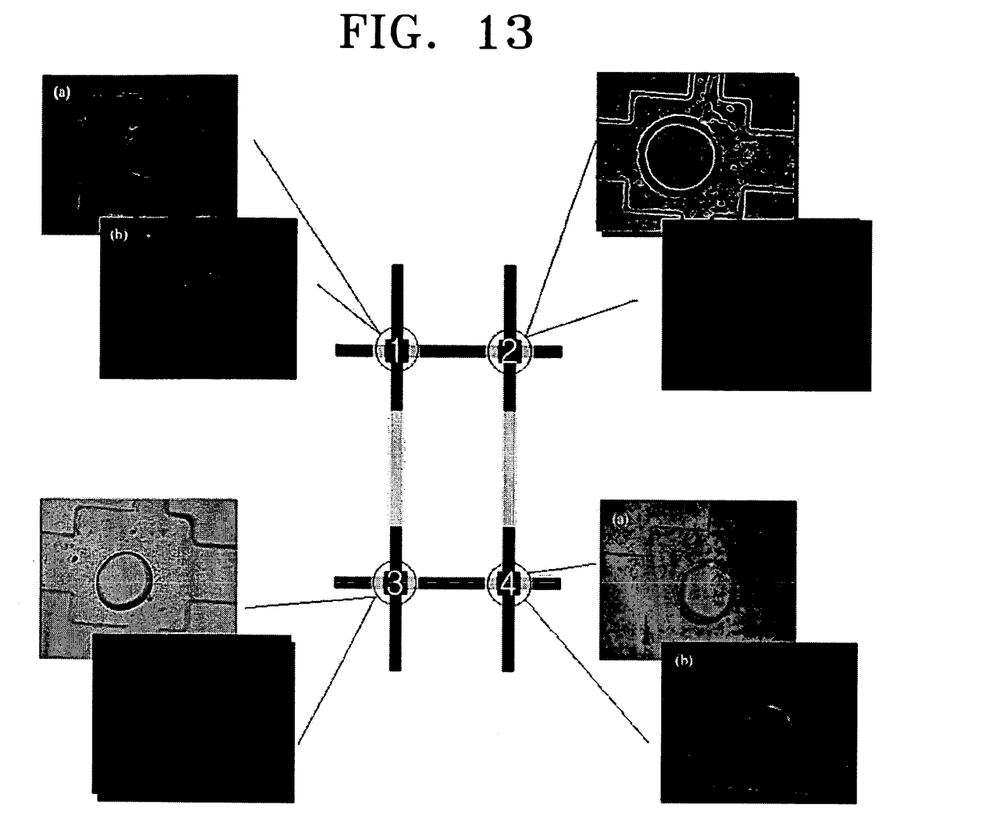
FIG. 13 is microscopic photographs of the results of the immunoassay in FIG. 2.

Referring to FIG. 13, the GMA gels in the probe immobilization regions 1 and 4 emit fluorescence, indicating that the probes match the target proteins, and the GMA gels in the probe immobilization regions 2 and 3 do not emit fluorescence, indicating the probes unmatch the target proteins. Therefore, it is confirmed that an accurate immunoassay can be performed using the microfluidic chip according to the present invention without causing cross-contamination between probes or samples.

EXAMPLE 3

Height Control of Probe Immobilization Region

Figure 14:
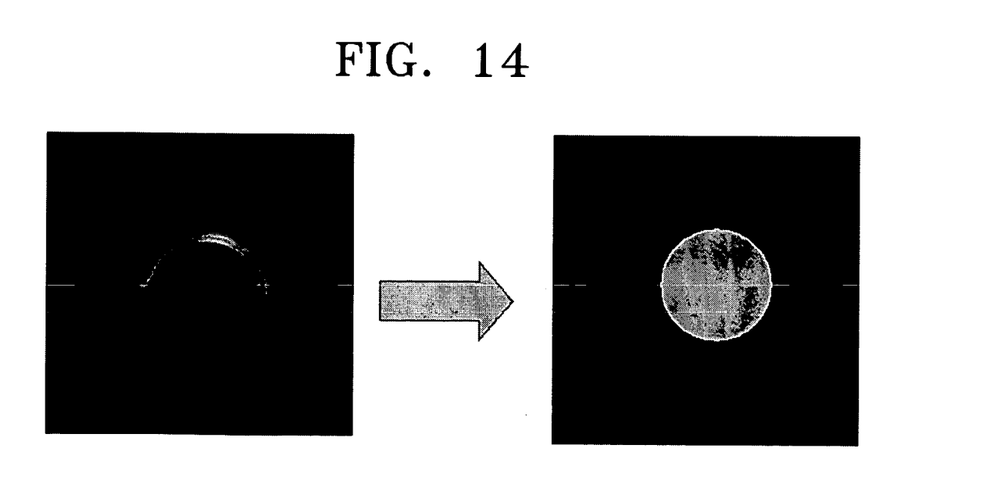
FIG. 14 is fluorescent microscopic photographs respectively before and after the height of the probe immobilization region is controlled.
Figure 15:
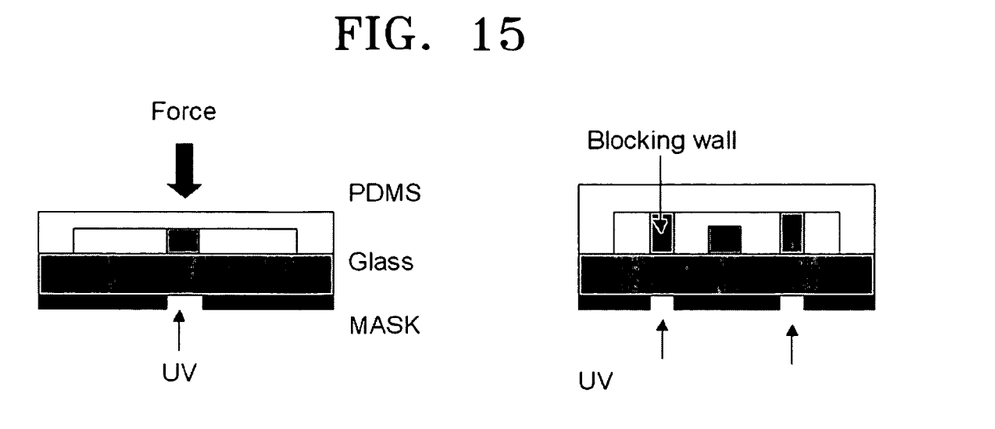
FIG. 15 is a schematic view illustrating a method of controlling the height of the probe immobilization region using pressure.

A microfluidic chip was fabricated in the same manner as in Example 1, except that the height of the probe immobilization regions was controlled not to reach the ceiling of the microfluidic channels. When the probe immobilization regions are separated from the ceiling of the microfluidic channels, the surface area of the probe immobilization regions to which probes bind increases, so that a probe-target sample binding signal with a large amplitude can be obtained. The left image in FIG. 14 is a fluorescent microscopic photograph of a probe immobilization region that is high enough to contact the ceiling of the microfluidic channel. In this photograph, the probes are bound only to the side of the probe immobilization gel pad, so that a florescent signal in an annular pattern appears. The right image in FIG. 14 is a fluorescent microscopic photograph of a probe immobilization region that is separated from the ceiling of the microfluidic channel. In this photograph, the probes are bound to the side and upper surface of the probe immobilization gel pad, so that a circular fluorescent signal appears.

The height of probe immobilization regions can be controlled using pressure. Referring to FIG. 12, a polymer in the probe immobilization regions is photopolymerized while a pressure is applied to the channel structure, the pressure is removed after the completion of the photopolymerzation, and then blocking walls are formed using photopolymerization, so that the height of the probe immobilization region does not reach the ceiling of the microfluidic channel.

Figure 16:
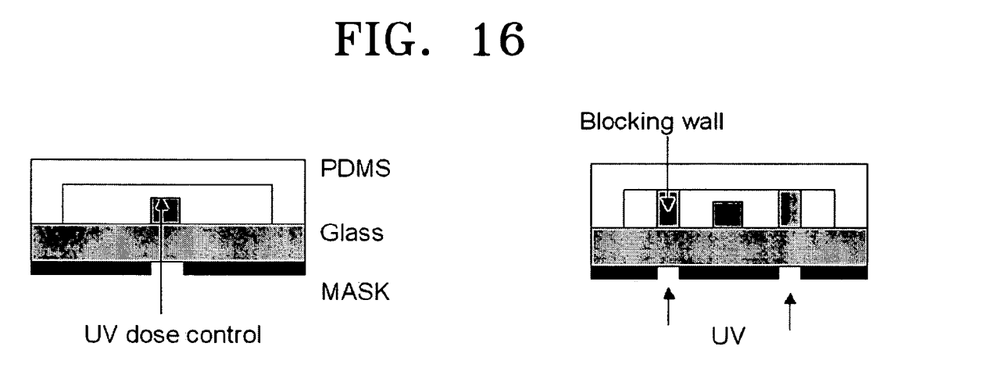
FIG. 16 is a schematic view illustrating a method of controlling the height of the probe immobilization region by partially polymerization.
Figure 17:
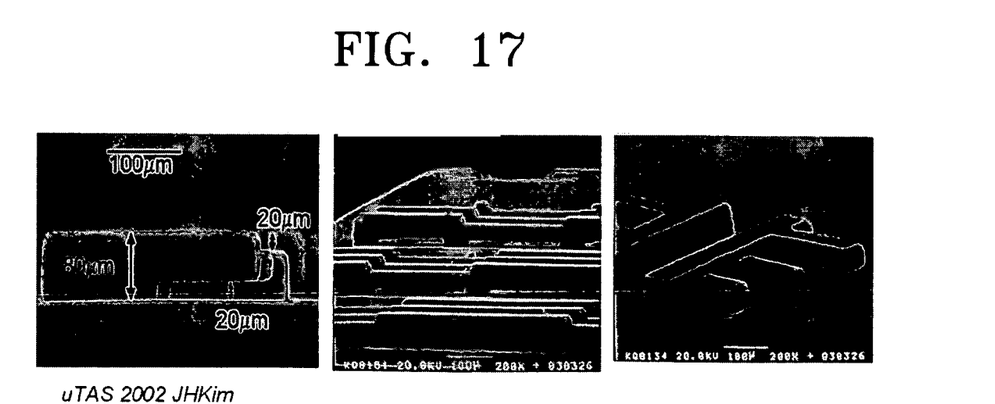
FIG. 17 is photographs showing that the height of polymer in probe immobilization regions can be controlled through partial polymerization by UV dose control.

In another method, the height of probe immobilization regions can be controlled using partial polymerization. Referring to FIG. 16, when photopolymerizing a polymer in a probe immobilization region, partially polymerization is induced by UV dose control such that the height of the probe immobilization region does not reach the ceiling of the microfluidic channel. FIG. 17 is photographs showing that the height of polymers in probe immobilization regions can be varied through partial polymerization by UV dose control (See. uTAS 2002 by J H Kim).

EXAMPLE 4

Probe Injection into Single-layered Microfluidic Channel

In a single-layered microfluidic channel, since the probe channels and sample channels cross each other and are interconnected, cross contaminations between samples and between probes may occur. In order to prevent the mixing of probes in different probe channels, the three methods described below can be used.

Figure 18A:
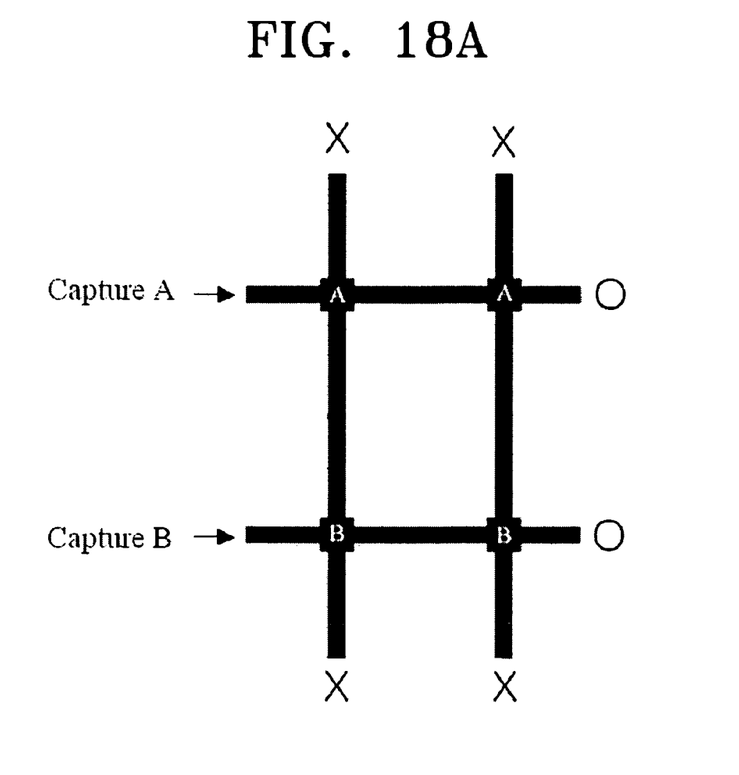
FIGS. 18A through 18C illustrate methods of injecting probes into a single-layered microfluidic channel.

In a first method, as illustrated in FIG. 18A, probes are simultaneously injected through the inlets of different probe channels at the same flow rate, while outlets of the probe channels opposite to the inlets are open and the inlets of sample channels are closed. In FIG. 18A, O indicates inlets or outlets which are open, and X indicates inlets or outlets which are closed. In this case, the probes can continue to flow through the channels under the same pressure toward their own outlets, not branching off toward other channels, wherein the pressure in the channels decreases from the outlets toward the inlets.

Figure 18B:
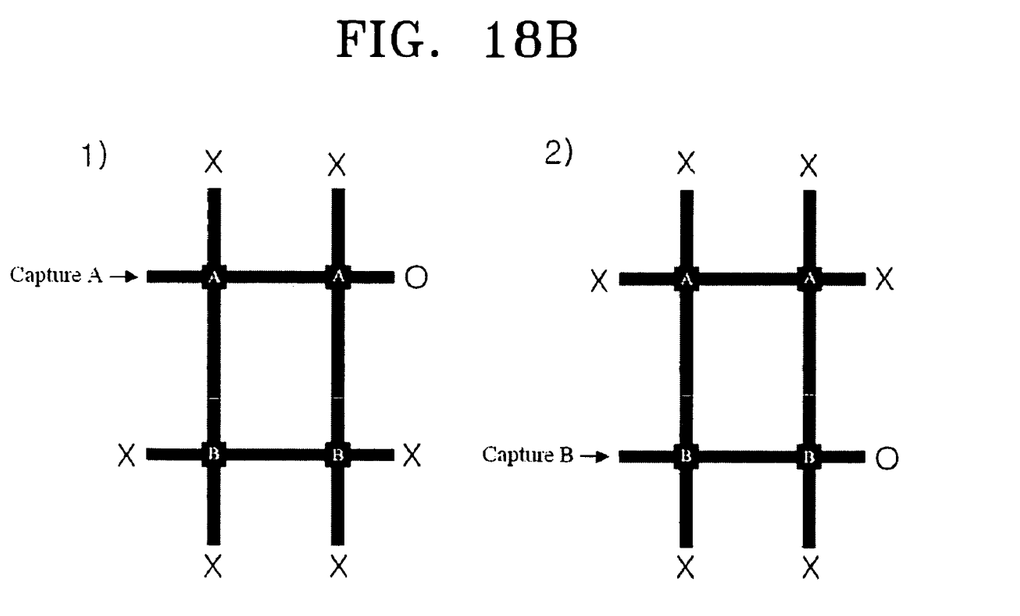

In a second method, as illustrated in FIG. 18B, probes are sequentially flowed through the inlet of a probe channel and then through the inlet of another probe channel while only the outlet of the probe channel in which the probes are flowing is open and the inlets and outlets of the other channels are closed. In FIG. 18B, O indicates inlets or outlets which are open, and X indicates inlets or outlets which are closed. In this case, the probes can continue to flow through the channels towards their own outlets. In FIG. 8B, probe A (Capture A) is initially flowed, and then probe B (Capture B) is flowed.

Figure 18C:
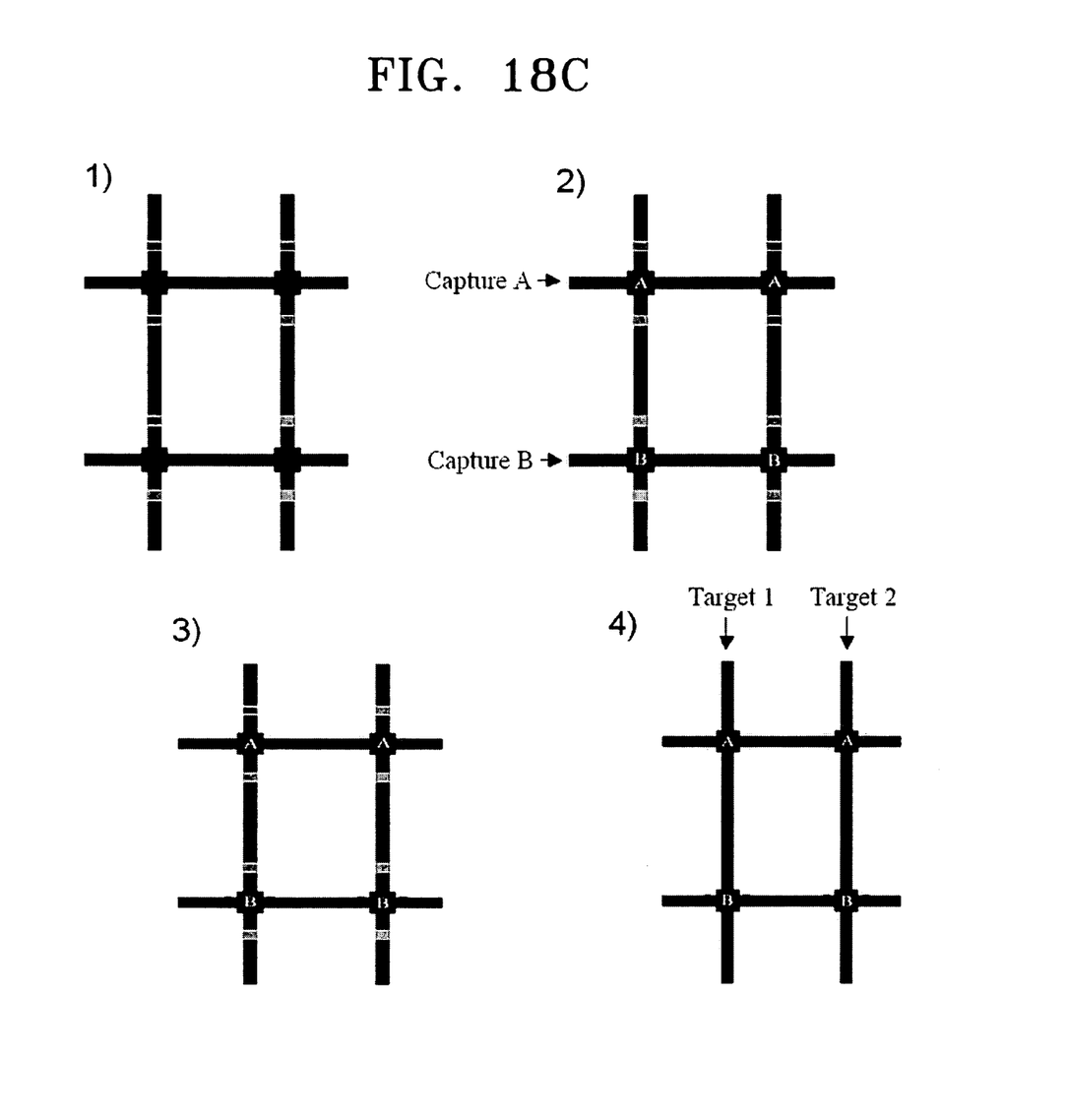

In a third method, as illustrated in FIG. 18C, probe blocking walls are formed in the sample channels above and below each of the intersections before flowing probes into the probe channels. The probe walls may be formed of hydrogel that undergoes volume change according to pH or temperature and thus can be used to open or close a channel. Hydrogel can be manufactured by photopolymerization of monomer units having ethylene groups. A polymer composed of monomers, such as acrylamid, methacrylamid, acylic acid, methacrylic acid, or amides or esters which are structurally associated with these monomers can be used for the probe blocking walls. Referring to FIG. 18C, probe blocking walls are formed in 1), different probes are flowed into the probe channels in 2), sample blocking walls are formed in the probe channels before and after each of the intersections between the probe channels and sample channels in 3), and the probe blocking walls are opened and different samples are flowed through the sample channels, respectively, in 4).

As described above, according to the present invention, after microfluidic channels are formed, probes are immobilized in the channels. Therefore, difficulty in connecting fluidic channels after the immobilization of probes on a substrate in the manufacturing of a conventional chip can be removed. In addition, a microfluidic platform for a multiple bioassay into which a plurality of samples can be simultaneously loaded can be formed. In addition, a process of manufacturing a single-layer microfluidic channel can be simplified, mixing of samples can be prevented by blocking walls, and probes can be effectively immobilized using polymer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of forming a microfluidic chip for a multiple bioassay, the method comprising:
    forming microfluidic channels by coupling a channel structure having grooves for sample channels and probe channels in a bottom surface and a substrate, wherein the sample channels and probe channels cross,
    forming probe immobilization regions at the intersections between the probe channels and the sample channels by photopolymerizing a polymer having biomolecule binding groups to the substrate, wherein the probe immobilization regions have biomolecule binding groups, and
    forming blocking walls in the probe channels before and after each of the probe immobilization regions to prevent mixing of target samples,
    wherein forming of blocking walls comprises disposing a polymer that does not have a biomolecule binding group before and after each of the probe immobilization regions by photopolymerizing the polymer that does not have the biomolecule binding group and the polymer that does not have the biomolecule binding group is a polyethyleneglycol diacrylate (PEG-DA) polymer.

2. The method of claim 1, wherein the polymer having the biomolecule binding group is a glycidyl methacrylate (GMA) polymer.

3. The method of claim 1, wherein the channel structure is a single layer composed of glass, PDMS, or polymer.

4. The method of claim 1, wherein the substrate is composed of silicon or glass.

5. The method of claim 1, wherein the height of the probe immobilization regions does not reach the ceiling of the microfluidic channels.

6. The method of claim 5, wherein, in the forming of the probe immobilization regions, a polymer is photopolymerized while a pressure is applied to the channel structure, and the pressure is removed after the completion of the photopolymerization.

7. The method of claim 5, wherein, in the forming of the probe immobilization regions, a polymer is partially photopolymerized by UV dose control.

8. The method of claim 1, further comprising immobilizing probes to the probe immobilization regions.

9. The method of claim 8, wherein the probes are biomolecules selected from the group consisting of DNA, RNA, peptide nucleic acid (PNA), locked nucleic acid (LNA), peptide, and protein.

* * * * *